Dec. 28, 1954
W. J. GRAHAM ET AL
2,697,894
LINE GUIDE FOR FISHING RODS
Filed June 18, 1951
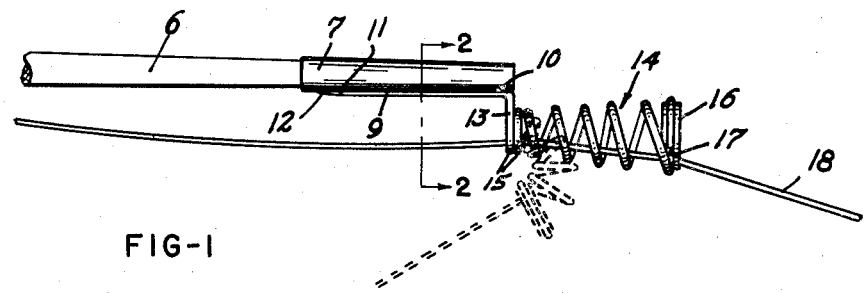
FIG-1
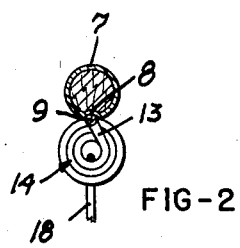
FIG-2
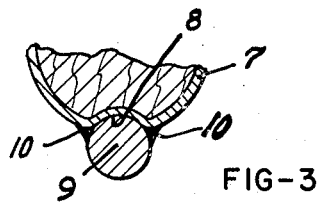
FIG-3
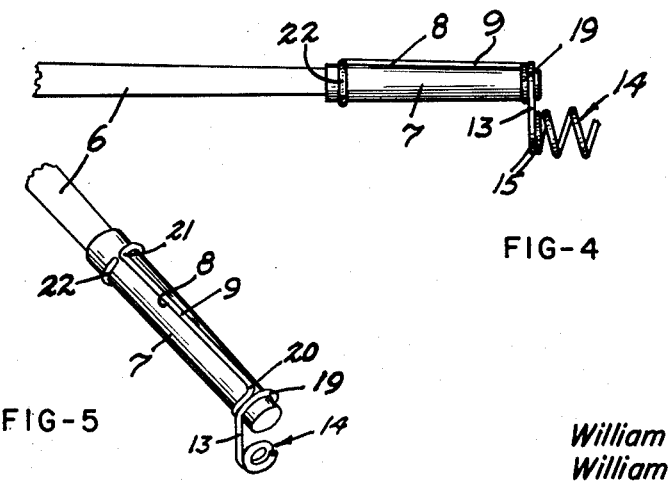
FIG-4
FIG-5
William J. Graham
William G. Graham
Inventors
By 
Attorney United States Patent Office 2,697,894
Patented Dec. 28, 1954

2,697,894

LINE GUIDE FOR FISHING RODS

William J. Graham and William G. Graham, Spokane, Wash.

Application June 18, 1951, Serial No. 232,101

5 Claims. (Cl. 43—24)

This invention relates to guides for string, lines and the like and more particularly to a line guide for fishing rods.

One object of the invention lies in the provision of a spiral spring adapted to be secured to the tip end portion of a fishing rod and through which a fishing line is axially threaded to afford free movement of the line for casting or reeling in a fish which may be caught on the hook at the end of the line.

Another object of the invention lies in the provision of a spiral spring which is resilient and thus bendable transversely in any direction when the line passing therethrough is put under tension while extending at an angle from the axial alignment of the rod and spring.

Another object of the invention lies in the provision of a spiral spring which when bent forms a relatively large radius thus precluding a sharp bend in the line which causes binding.

Another object of the invention lies in the provision of a straight portion disposed at right angles to the axial alignment of the spring between the spiral spring and the securing means and thereby spacing the spring outwardly, in a transverse direction, from the end portion of the rod.

Another object lies in the provision of a metal cap or ferrule mounted on the tip end portion of the fishing rod and adapted to secure the fastening arm of the spiral spring.

Another object of the invention lies in the construction and arrangement of parts as will be more particularly set forth in the following specification and specifically indicated in the claims.

In the drawings, forming a part of this specification, and in which like numerals are employed to designate like parts, Figure 1 is a side elevation of the forward or tip end of a fishing rod having my improved tip applied, Figure 2 is a transverse cross section through the cap as at line 2—2 of Fig. 1, Figure 3 is an enlarged fragmentary transverse cross section of the cap and fastening arm, Figure 4 is a side elevation of the forward end of a fishing rod having a modified means of securing the improved tip, and Figure 5 is a perspective view of the modified securing means.

Referring now more particularly to the drawings, the numeral 6 indicates the usual fishing rod, whether of the sectional type or otherwise, which has the usual reel and intermediate guides (not shown). The forward end of the rod 6 is provided with a ferrule or cap 7 which is secured on the rod by reason of it being a press fit, and also by means of a longitudinal groove 8 which is formed in the cap after it is placed on the rod.

The improved tip is secured to the cap 7 by means of a securing arm 9 which is placed parallel with the rod and in the groove 8 of cap 7 where it is secured as by welding 10. The rearwardly extending end 11 of arm 9 is ground or shaped at 12 to form a beveled and smooth face or approach for the fishing line 18 so that in the event it touches this point during a casting operation or when a fish on the end of the line runs, it will not be liable to snag or catch and tear or break the line.

Bent at right angles to the fastening arm 9 there is a straight portion 13 depending therefrom at an angle to dispose the integral spiral spring 14 with its axial alignment off set from the axial alignment of the rod 6. The straight portion, at its lower end, merges into the first coils of the spiral spring 14.

The first two coils 15 of the spiral spring are positioned adjacent each other to form a strong relatively unyielding portion with relation to the balance of the spring 14. The balance of the spring comprises coils which are spaced from each other and successively increase in size toward the outer end thereof. A jewel 16 is provided with a peripheral groove 17 and the terminal coil is positioned vertically and secures the jewel by encircling it and yieldably clamping in the peripheral groove 17. The jewel 16 is provided with an open center and the fishing line 18 is threaded from the reel through the intermediate guides spaced along the rod and thence through the spring 14 and its jewel 16.

When the fishing line is placed under tension and is extending from the tip in angular relation to the normal axial alignment of the spiral spring, the spring will bend transversely and since each of the outer coils is successively larger, than the next successive inner coil, it will have less resistance to this bending tension and the tip will take the position of a comparatively large radius curve as shown in Fig. 1 by dotted lines. The present tips have a small eye, and the line must take an acute bend over the rim of the eye when tension is applied to the line at the same angle.

In Figures 4 and 5 I have shown a modified method of securing the spiral spring 14 to the cap 7. In accomplishing this, I have used the rod 6 and cap 7 which has the longitudinal groove 8. The straight portion 13 extends from the spring 14 and passes about the cap 7 adjacent its forward end traversing slightly more than one full turn and thus forms a loop 19 which terminates in a right angle bend 20 at the top of the rod and from which arm 9 extends rearwardly in the groove 8. Spaced from the rear end of cap 7 the arm is formed with a second right angle bend 21 and another loop 22 passes about the cap in the opposite direction from the first mentioned loop, and secures the rear end of the securing arm 9. Arm 9 resting in the groove prevents rotation of the tip about the cap, and also permits the tip to be changed with facility, precluding the use of a torch for welding or soldering. The loops 19 and 22 have gripping engagement on the cap to prevent accidental longitudinal displacement of the tip.

Having thus described our invention, what we claim as new and desire to secure by Letters Patent is:

1. A line guide for attachment to the tip end portion of a fishing rod comprising a cap for the fishing rod, said cap having an inwardly disposed groove therein, for securing the cap to the fishing rod, a securing arm secured in said groove, and a spiral spring axially offset from said cap and secured thereto by said securing arm, said spring having close wound coils at its inner and outer ends.

2. A line guide for attachment to the tip end portion of a fishing rod comprising a cap for the fishing rod, said cap having an inwardly disposed groove therein for securing the cap to the fishing rod, a securing arm secured in said groove, and a spiral spring line guide axially offset from said cap and secured thereto by said securing arm.

3. A line guide for attachment to the tip end portion of a fishing rod comprising a cap for the fishing rod, said cap having an inwardly disposed groove therein, for securing the cap to the fishing rod, a securing arm secured in said groove, a spiral spring line guide axially offset from said cap and secured thereto by said securing arm, relatively small close wound rigid coils on the end of said spiral spring, the end one of which is secured to said securing arm, successively larger spaced and more resilient coils toward the opposite end of said spring, a close wound terminal coil at the free end of said spring, and an open center jewel in said terminal coil.

4. A line guide for attachment to the tip end portion of a fishing rod comprising a metal cap, said cap having an inwardly disposed groove therein, for securing the cap to the fishing rod, a resilient spiral spring for receiving a fishing line through the longitudinal center thereof, a straight portion on one end of said spring, a securing arm disposed at right angles to said straight portion and extending rearwardly in said groove, and said securing arm being welded in said groove, whereby said spring is disposed axially offset with relation to said cap.

5. A line guide for attachment to the tip end portion of a fishing rod comprising a metal cap, said cap having an inwardly disposed groove therein, for securing the cap to the fishing rod, a resilient spiral spring for receiving a fishing line through the longitudinal center thereof, a straight portion at one end of said spring, said straight portion terminating in a loop about the outer end of said cap, and a securing arm having a loop at its inner end extending rearwardly in said groove and integral with first mentioned loop.

References Cited in the file of this patent

UNITED STATES PATENTS

| Number | Name | Date |
|---|---|---|
| 343,802 | Everett | June 15, 1886 |
| 389,921 | Cage | Sept. 25, 1888 |
| 703,996 | Cattley | July 8, 1902 |
| 1,625,477 | Leahy | Apr. 19, 1927 |
| 1,700,831 | Downing | Feb. 5, 1929 |
| 1,959,158 | Etzkorn | May 15, 1934 |
| 1,964,631 | Hansen | June 26, 1934 |
| 2,216,002 | Doremus | Sept. 24, 1940 |
| 2,227,868 | Tengel et al. | Jan. 7, 1941 |
| 2,484,727 | Patterson | Oct. 11, 1949 |
| 2,561,675 | Ross | July 24, 1951 |